(12) United States Patent
Park et al.

(10) Patent No.: US 8,314,030 B2
(45) Date of Patent: Nov. 20, 2012

(54) METHOD FOR FABRICATING SEMICONDUCTOR DEVICE

(75) Inventors: Jum-Yong Park, Gyeonggi-do (KR); Noh-Jung Kwak, Gyeonggi-do (KR); Yong-Soo Choi, Gyeonggi-do (KR); Cheol-Hwi Ryu, Gyeonggi-do (KR)

(73) Assignee: Hynix Semiconductor, Inc., Gyeonggi-do (KR)

( * ) Notice: Subject to any disclaimer, the term of this patent is extended or adjusted under 35 U.S.C. 154(b) by 683 days.

(21) Appl. No.: 12/489,747

(22) Filed: Jun. 23, 2009

(65) Prior Publication Data
US 2010/0184359 A1    Jul. 22, 2010

(30) Foreign Application Priority Data

Jan. 16, 2009 (KR) .................. 10-2009-0003790

(51) Int. Cl.
*H01L 21/302* (2006.01)
*B44C 1/22* (2006.01)

(52) U.S. Cl. ............ 438/693; 438/692; 216/88; 216/89; 252/79.1; 252/79.4

(58) Field of Classification Search ............... 438/692, 438/693; 216/88, 89; 252/79.1, 79.4
See application file for complete search history.

(56) References Cited

U.S. PATENT DOCUMENTS

| 6,664,170 | B1 * | 12/2003 | Lee .............................. 438/424 |
| 7,368,388 | B2 * | 5/2008 | Small et al. ..................... 438/692 |
| 7,524,475 | B2 * | 4/2009 | Cho et al. ........................ 423/263 |
| 2006/0234509 | A1 * | 10/2006 | Small et al. ..................... 438/692 |

FOREIGN PATENT DOCUMENTS

| JP | 2001-329250 | 11/2001 |
| JP | 2001-329251 | 11/2001 |
| JP | 2006-339594 | 12/2006 |
| JP | 2007-036270 | 2/2007 |

OTHER PUBLICATIONS

Notice of Allowance issued from Korean Intellectual Property Office on Sep. 20, 2011.

* cited by examiner

*Primary Examiner* — Shamim Ahmed
(74) *Attorney, Agent, or Firm* — IP & T Group LLP (57) ABSTRACT

A method for fabricating a semiconductor device through a chemical mechanical polishing (CMP) process is provided. The CMP process is performed by using a slurry. The semiconductor device fabrication method can ensure the reliability and economical efficiency of the device by performing a CMP process using a CMP slurry having a high polishing selectivity with respect to a target surface, an anti-scratch characteristic, and a high global planarization characteristic.

21 Claims, 10 Drawing Sheets

METHOD FOR FABRICATING SEMICONDUCTOR DEVICE

CROSS-REFERENCE TO RELATED APPLICATIONS

The present invention claims priority of Korean patent application number 10-2009-0003790, filed on Jan. 16, 2009, the disclosure of which is incorporated herein by reference in its entirety.

BACKGROUND OF THE INVENTION

The present invention relates to a method for fabricating a semiconductor device, and more particularly, to a semiconductor device fabricating method which has improved polishing selectivity and Within Wafer Non-Uniformity (WIWNU) over a target surface by applying chemical mechanical polishing (CMP) slurry with excellent polishing characteristic and polishing efficiency in a polishing process.

A CMP process is essential to a planarization process among semiconductor device fabricating processes and it is performed by introducing a liquid-phase slurry between a top surface of a wafer and a rotating elastic pad, chemically removing target materials, and mechanically removing the surface of the wafer by using an ultra-fine abrasive.

CMP processes currently used in the semiconductor device fabricating processes may be classified into an interlayer deposition (ILD) CMP process, a shallow trench isolation (STI) CMP process, a plug poly isolation CMP process, and a storage node isolation CMP process, and a metal CMP process.

In particular, the reliability and economical efficiency of the semiconductor device in the CMP process on heterogeneous layers can be improved by increasing a polishing rate with respect to the target surface in terms of polishing efficiency.

For example, in the case of an STI CMP process, CMP slurry commonly used does not have a sufficiently high polishing selectivity to an oxide layer compared with a nitride layer, and thus, the nitride layer is formed as a thick layer in order to obtain a flat oxide layer with a uniform thickness. To solve those limitations, a CMP process is performed by using a slurry with a higher polishing selectivity to an oxide layer than a nitride layer.

In addition, according to a conventional CMP technology, since a central part of a wafer is apt to be more polished than an edge part thereof, the wafer has an overall U-shaped or W-shaped global longitudinal section. In order to solve such a global planarization problem, a process margin for the nitride layer in the actual STI process is set large to ensure a stable polishing completion time point, but it serves as a waste of the process.

Therefore, it is desirable to use a slurry that has such an excellent polishing characteristic as to improve a global planarization of a wafer in the CMP process.

Furthermore, a physical friction between an abrasive or polishing pad and a wafer during the CMP process may cause scratches on the target surface. Thus, the scratches of the target surface in the CMP process are desired to be minimized in order to ensure the reliability of the device.

As such, in case where a heterogeneous layer is revealed by the CMP process, it is required to use a slurry that has a high polishing rate with respect to the target surface, an anti-scratch characteristic, and a polishing characteristic capable of improving a global planarization.

SUMMARY OF THE INVENTION

Embodiments of the present invention are directed to providing a semiconductor device fabricating method that can ensure the reliability and economical efficiency of the device by performing a CMP process using a CMP slurry having a high polishing selectivity with respect to a target surface, an anti-scratch characteristic, and a high global planarization characteristic.

DESCRIPTION OF SPECIFIC EMBODIMENTS

Other objects and advantages of the present invention can be understood from the following description, and become more apparent in light of the embodiments of the present invention.

In fabricating a semiconductor device in accordance with an embodiment of the present invention, a CMP process is performed using a slurry including: a cerium oxide powder with a bimodal particle size distribution in which a volume fraction of cerium oxide particle having a particle size of approximately 0.01 µm to approximately 1 µm to cerium oxide particle having a particle size of approximately 1 µm to 10 µm is in a range between approximately 10:90 and approximately 90:10, wherein the cerium oxide particle having the particle size of approximately 0.01 µm to approximately 1 µm has a specific surface area of 5 $m^2$/g or more; a volume fraction of a pore having a diameter of 3 nm or more to a pore having a diameter of less than 3 nm is in a range between approximately 8:2 and approximately 2:8; and the cerium oxide particle having the particle size of approximately 1 μm to approximately 10 μm is a secondary particle formed by aggregation of the cerium oxide particle having the particle size of approximately 0.01 μm to approximately 1 μm; a first polyacrylic acid having a weight average molecular weight of approximately 2,000 to approximately 8,000, and a second polyacrylic acid having a weight average molecular weight of approximately 5,000 to 10,000; a compound having a weight average molecular weight of approximately 30 to approximately 500 and containing either or both of a hydroxyl group (OH) and a carboxyl group (COOH); and a water.

In the CMP slurry, when the cerium oxide particle having the specific surface area of approximately 5 $m^2/g$ or more, having the volume fraction of the pore having a diameter of 3 nm or more to the pore having a diameter of less than 3 nm in a range between approximately 8:2 and approximately 2:8, and having a particle size of approximately 0.01 μm to approximately 1 μm, the first polyacrylic acid having the weight average molecular weight of approximately 2,000 to approximately 8,000, and the second polyacrylic acid having the weight average molecular weight of approximately 5,000 to 10,000 are mixed, a part of the cerium oxide particles is aggregated with one another so that the secondary cerium oxide particle having a particle size of approximately 1 μm to approximately 10 μm can be easily formed. Herein, the pore distribution, the fraction, and the specific surface area are measured by a BET method.

The CMP slurry used in the method for fabricating the semiconductor device in accordance with the embodiment of the present invention includes a cerium oxide powder having a bimodal particle size distribution in which cerium oxide having a small particle size and cerium oxide having a large particle size coexist. Thus, when the above-mentioned slurry is applied in the CMP process, the polishing efficiency can be improved. That is, the cerium oxide having a large particle size polishes a region in which a large amount of oxide layer is stacked, and the cerium oxide having a small particle size polishes a region in which a relatively small amount of the oxide layer is stacked, thus improving the polishing rate.

Furthermore, since the cerium oxide particle having the large particle size in the slurry is a secondary particle of aggregation type, it is easily broken when a physical force is applied due to a polishing pad. Therefore, when the slurry is applied to the CMP process, the scratches of the target surface can be minimized.

In the CMP slurry used in the embodiment of the present invention, a content of the cerium oxide powder having the bimodal particle size distribution may range from approximately 0.1 to approximately 10 parts by weight per 100 parts by weight of the slurry. If the content of the cerium oxide powder serving as an abrasive is less than 0.1 parts by weight, the polishing rate of the oxide layer may be remarkably reduced. If the content of the cerium oxide powder is more than 10 parts by weight, it may be difficult to provide a stable slurry in the distribution and polishing of the slurry.

Furthermore, a total content of the first and second polyacrylic acids may be in a range of approximately 0.05 to approximately 20 parts by weight per 100 parts by weight of the cerium oxide power serving as an abrasive. If the total content of the first and second polyacrylic acids is less than 0.05 parts by weight, the dispersion is low and thus the precipitation is rapidly carried out. Consequently, the supply of the abrasive may not be uniform because precipitation (separation of solid and liquid) occurs in transferring the slurry. If the total content of the first and second polyacrylic acids is more than 20 parts by weight, the conductivity within the slurry is increased by a large amount of the polyacrylic acids and thus excessive aggregation may occur between the cerium oxide particles.

Moreover, a mass ratio of the first polyacrylic acid to the second polyacrylic acid may be in a range of approximately 70:30 to approximately 30:70. If the volume fraction of the first polyacrylic acid is less than 70, the dispersion of the slurry is degraded and thus many scratches may occur on the polished surface. If the volume fraction of the second polyacrylic acid is less than 70, excessive aggregation occurs between the cerium oxide particles. Consequently, the dispersion of the slurry may be deteriorated and the polishing rate of the nitride layer and the oxide layer may be reduced.

In the slurry used in this embodiment, the first polyacrylic acid having a low molecular weight can easily cause dispersion between the cerium oxide particles, and the second polyacrylic acid having a high molecular weight can aggregate the cerium oxide particles to form a secondary particle. In the case of the cerium oxide having the above-mentioned pore distribution, fraction and specific surface area, the aggregatable surface area is wide. Therefore, in the CMP slurry used in this embodiment, appropriate balance between the dispersion and aggregation of the cerium oxide particles can be derived.

In the CMP slurry used in this embodiment, the cerium oxide powder can be adjusted to have the optimal particle size distribution. That is, the volume fraction of the cerium oxide particle having the particle size of approximately 0.01 μm to approximately 1 μm to the cerium oxide particle having the particle size of approximately 1 μm to 10 μm can be adjusted to be in a range from approximately 90:10 to approximately 10:90. As a result, excellent performance can be exhibited in view of the polishing rate, the polishing selectivity to the target surface, especially the polishing rate ratio of the oxide layer to the nitride layer, and the anti-scratch characteristic of the target surface. Therefore, since the CMP slurry can exhibit the excellent polishing performance without separate additive, it is suitable for being introduced as one-component type in the CMP process.

Meanwhile, a content of the compound having the weight average molecular weight of approximately 30 to approximately 500 and containing either or both of the hydroxyl group (OH) and the carboxyl group (COOH) may be in a range of approximately 0.01 to approximately 30 parts by weight per 100 parts by weight of the cerium oxide powder serving as an abrasive in the CMP slurry. If the content of the compound is less than 0.01 parts by weight, the selectivity and planarity are lowered. If the content of the compound is more than 30 parts by weight, the polishing rate of the oxide layer is lowered.

A weight average molecular weight of the compound containing either or both of the hydroxyl group (OH) and the carboxyl group (COOH) may be in a range of approximately 30 to approximately 500. If the weight average molecular weight of the compound is more than 500, the polishing rate of the oxide layer is reduced or the dispersion stability of the slurry is reduced. Thus, the uniform supply of the slurry is difficult.

The compound having the weight average molecular weight of approximately 30 to approximately 500 and containing either or both of the hydroxyl group (OH) and the carboxyl group (COOH) may be one selected from the group comprising citrate-containing compounds, gluoconate-containing compounds, malate-containing compounds, tartarate-containing compounds, 2-hydroxyisobutyrate-containing compounds, adipate-containing compounds, octanoate-containing compounds, succinate-containing compounds, ethylenediaminetetracetate (EDTA)-containing compounds, glutarate-containing compounds, methylenesuccinate-containing compounds, mannose, glycerol-galacto-heptose, erythro-manno-octose, arabino-galacto-nonose, glutamine, and derivatives thereof.

At this point, the compound containing the functional group includes acids containing the functional group, for example, citric acid, gluconic acid, malic acid, tartaric acid, 2-hydroxyisobutyric acid, dipic acid, octanoic acid, succinic acid, ethylenediaminetetracetic acid (EDTA), glutaric acid, and methylenesuccinic acid, and compounds in which metallic or organic functional group is bonded to the above-mentioned functional group.

Meanwhile, in accordance with an embodiment of the present invention, in case of using the CMP slurry having the weight average molecular weight of approximately 30 to approximately 500 and containing either or both of the hydroxyl group (OH) and the carboxyl group (COOH), its viscosity is reduced by 5% to 30% (for example, 1.1 cPs to 1.9 cPs), compared with the conventional CMP slurry that does not contain the above-mentioned compounds. Even if the CMP slurry contains the compound, the dispersion stability is excellent and thus it is adaptable for being applied as one-component type. Furthermore, since the CMP slurry has a low viscosity, the polishing pad and the wafer to be polished can contact more uniformly during the polishing of the wafer due to Newtonian behavior. Thus, the wafer can be polished uniformly as a whole, and a within wafer non-uniformity (WIWNU) can be improved.

In the CMP slurry, the content of the water may be determined after the contents of the abrasive, the dispersant, and other additives are determined.

The CMP slurry used in this embodiment may be introduced in one-component type. The one-component type slurry contains all components required in the polishing within one compound, for example, abrasive, water, and additive. Generally, since the one-component type slurry is used by being mixed with only distilled water, it can be used for a long time even after the mixture. Also, since its use is possible by a simple mixer, an equipment cost is reduced, and the management of the slurry is easy.

Meanwhile, in order to improve the polishing performance, additive for improving the polishing selectivity, and additive for improving the WIWNU are used in the CMP slurry. Those additives degrade the dispersion stability and it is difficult to be introduced as one-compound slurry. Moreover, when the additives are introduced as two-component type slurry, that is, the slurry components are separated into two or more different solutions, for example, a set of an abrasive dispersing solution and an additive dispersing solution are introduced in a mixed form just before the polishing, the dispersion characteristic is greatly degraded due to the additive after the mixture, and thus, it should be immediately used within approximately 30 minutes.

To solve those limitations, one-component slurry having an optimal composition that can ensure excellent polishing performance and dispersion stability is applied to the CMP process.

In the CMP process using the slurry, the polishing pressure and the polishing table speed are appropriately adjusted according to kinds of layers, conditions of the CMP process, and so on. For example, the CMP process may be performed at the polishing pressure of approximately 1 psi to approximately 10 psi at the polishing table speed of approximately 10 rpm to approximately 100 rpm.

In accordance with an embodiment of the present invention, the CMP process using the slurry may be used in a CMP process for a heterogeneous layer.

In particular, the CMP process using the slurry may be used in a shallow trench isolation (STI) CMP process, an interlayer dielectric (ILD) CMP process, a plug poly isolation CMP process, a storage node isolation CMP process, or a metal CMP process.

FIGS. 1A to 1F are cross-sectional views illustrating a method for fabricating a semiconductor device using an STI CMP process in accordance with an embodiment of the present invention.

Figure 1A:
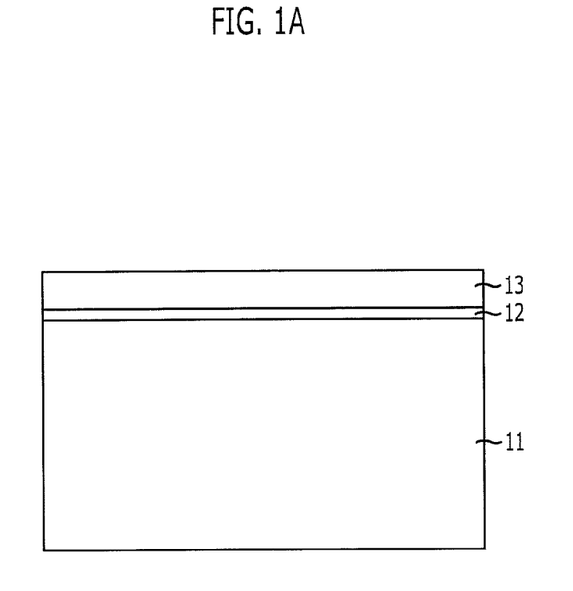
FIGS. 1A to 1F are cross-sectional views illustrating a method for fabricating a semiconductor device by using a shallow trench isolation (STI) chemical mechanical polishing (CMP) process in accordance with an embodiment of the present invention.

Referring to FIG. 1A, a hard mask is formed over a semiconductor substrate 1. The hard mask may have a stacked structure of a pad oxide layer 12 and a pad nitride layer 13. The pad oxide layer 12 buffers stress applied to the semiconductor substrate 11 during deposition of the pad nitride layer 13, and may be formed to a thickness of approximately 100 Å to approximately 150 Å. The pad nitride layer 13 serves as a polishing stop layer during a subsequent CMP process on a gap-fill insulation layer and serves as a hard mask during formation of a trench, and may be formed to a thickness of approximately 500 Å to approximately 1,000 Å.

A photoresist layer is coated over the pad nitride layer 13 and patterned to form a device isolation mask (not shown) through exposure and development processes. Using the device isolation mask as an etch barrier, the pad nitride layer 13 and the pad oxide layer 12 are sequentially etched to form a pad oxide pattern 12A and a pad nitride pattern 13A, thus exposing the surface of the semiconductor substrate 11 where a trench being a device isolation region will be formed. The device isolation mask is stripped using oxygen plasma.

Figure 1B:
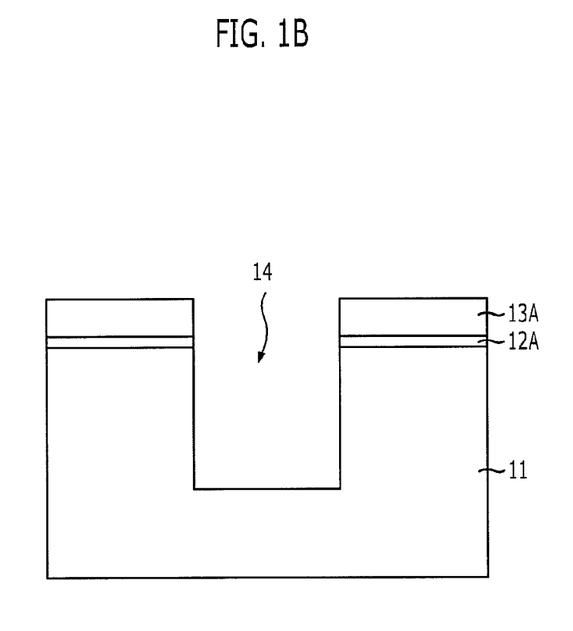

Referring to FIG. 1B, by using the pad nitride pattern 13A as a hard mask, the exposed semiconductor substrate 11 is etched to a certain depth to form a trench 14.

Figure 1C:
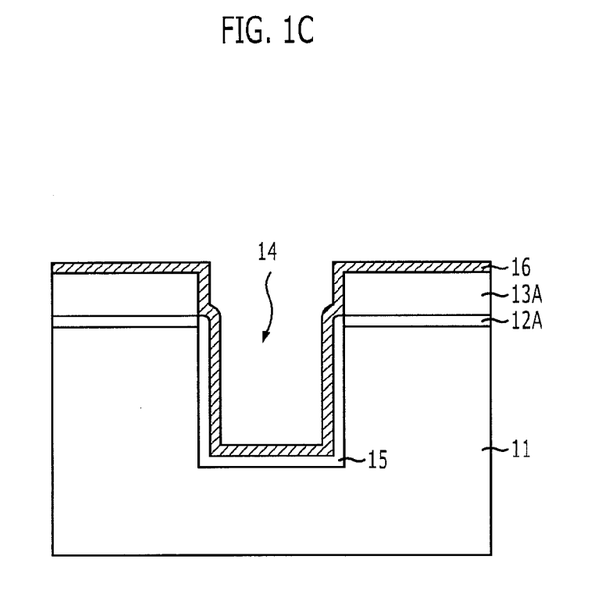

Referring to FIG. 1C, by performing a sidewall oxidation using a dry oxidation process in order to remove etching damage caused during the etching process of forming the trench 14, a sidewall oxide layer 15 is formed on the surface of the semiconductor substrate 11 and the sidewall of the pad oxide pattern 12A, which are exposed due to the formation of the trench 14. The thickness of the sidewall oxide layer 15 may be in a range from approximately 50 Å to approximately 100 Å.

In order to improve refresh, a liner nitride layer 16 is formed over the pad nitride pattern 13A including the sidewall oxide layer 15. The liner nitride layer 16 may be formed by using Low Pressure Chemical Vapor Deposition (LPCVD), Plasma Enhanced Chemical Vapor Deposition (PECVD), or Atomic Layer Deposition (ALD). The thickness of the liner nitride layer 16 may be in a range from 50 Å to 100 Å.

The sidewall oxide layer 15 and the liner nitride layer 16 may be selectively formed in order to remove the etching damage and improve the refresh.

Figure 1D:
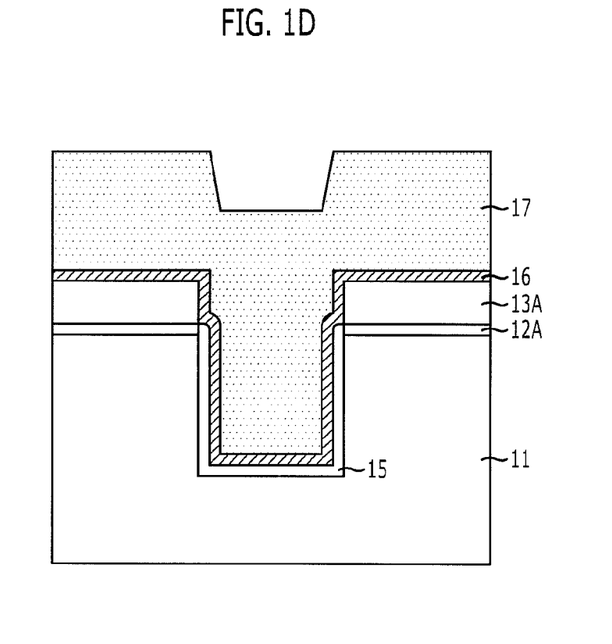

Referring to FIG. 1D, a gap-fill insulation layer 17 for device isolation is formed over the liner nitride layer 16 to fill the trench 14.

The gap-fill insulation layer 17 for the device isolation may be an oxide layer. For example, the gap-fill insulation layer 17 may be at least one selected from the group comprising a Spin On Dielectric (SOD) layer, a High Density Plasma (HDP) layer, a thermal oxide layer, a Borophosphate Silicate Glass (BPSG) layer, a Phospho Silicate Glass (PSG) layer, a Boro Silicate Glass (BSG) layer, a Fluorinated Silicate Glass (FSG) layer, a Low Pressure Tetra Ethyl Ortho Silicate (LP-TEOS) layer, a Plasma Enhanced Tetra Ethyl Ortho Silicate (PETEOS) layer, a High Temperature Oxide (HTO) layer, a Medium Temperature Oxide (MTO) layer, an Undoped Silicate Glass (USG) layer, a Spin On Glass (SOG) layer, an Advanced Planarization Layer (APL) layer, an Atomic Layer Deposition (ALD) layer, a Plasma Enhanced (PE) Oxide layer, an $O_3$-Tetra Ethyl Ortho Silicate ($O_3$-TEOS) layer, and combinations thereof.

Figure 1E:
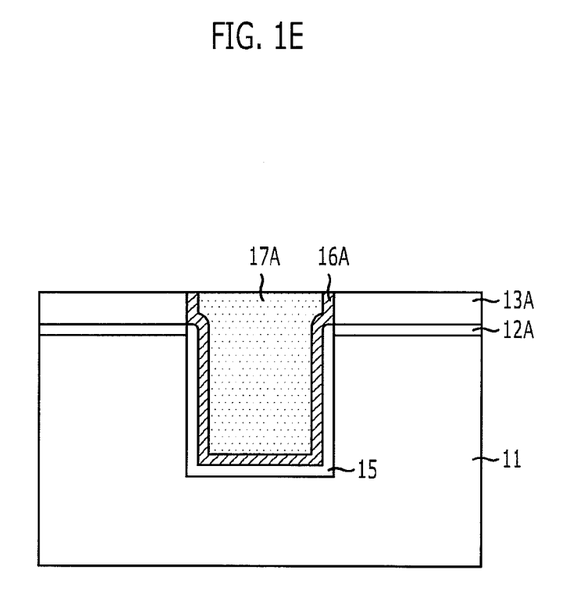

Referring to FIG. 1E, by using the pad nitride pattern 13A as a polishing stop layer, a CMP process is performed on the gap-fill insulation layer 17 using the above-mentioned slurry till the pad nitride pattern 13A is exposed. As the CMP result, the primarily polished liner insulation layer 16A and the polished gap-fill insulation layer 17A remain.

Figure 1F:
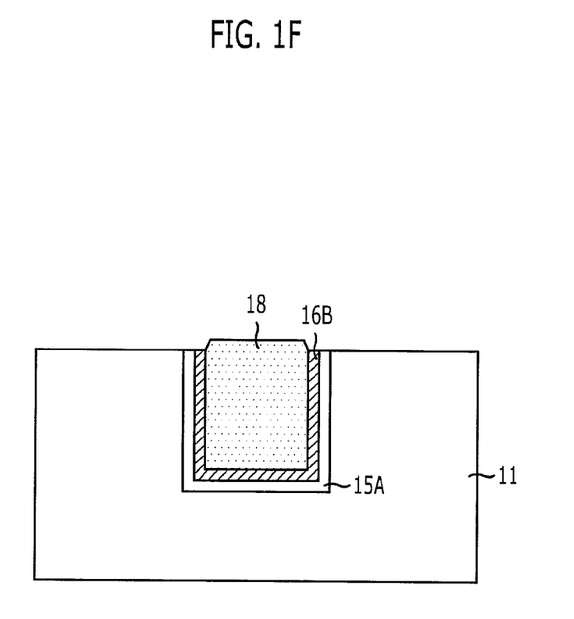

Referring to FIG. 1F, the exposed pad nitride pattern 13A and pad oxide pattern 12A are removed to form a device isolation layer 18 inside the trench. The pad nitride pattern 13A may be removed by a stripping process using a phosphoric acid solution, and the pad oxide pattern 12A may be removed by a stripping process using a fluoric acid solution. Through these procedures, a stripped liner nitride layer 16B and a stripped sidewall oxide layer 15A are formed.

In the method for fabricating the semiconductor device using the STI CMP process in accordance with the embodiment of the present invention, since the polishing efficiency is excellent and the polishing selectivity of the oxide layer to the nitride layer is high, the polished gap-fill insulation layer 17A can be polished at high polishing rate with respect to the polished liner nitride layer 16A and/or the polished pad nitride pattern 13A. Thus, the WIWNU can be improved and the scratches of the target surface can be prevented.

FIGS. 2A to 2D are cross-sectional views illustrating a method for fabricating a semiconductor device using an ILD CMP process in accordance with another embodiment of the present invention.

Figure 2A:
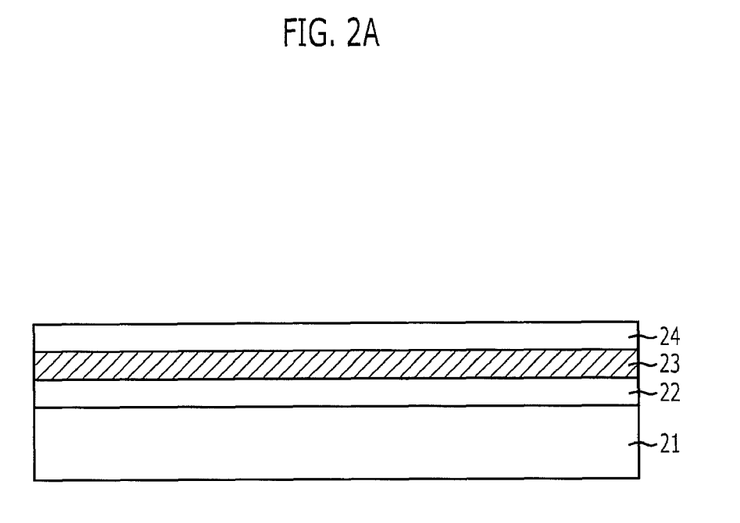
FIGS. 2A to 2D are cross-sectional views illustrating a method for fabricating a semiconductor device by using an interlayer dielectric (ILD) CMP process in accordance with an embodiment of the present invention.

Referring to FIG. 2A, a polysilicon layer 22, a conductive layer 23 for gate electrode, and a hard mask nitride layer 24 are sequentially formed over a semiconductor substrate 21 where a device isolation layer (not shown) is formed.

Figure 2B:
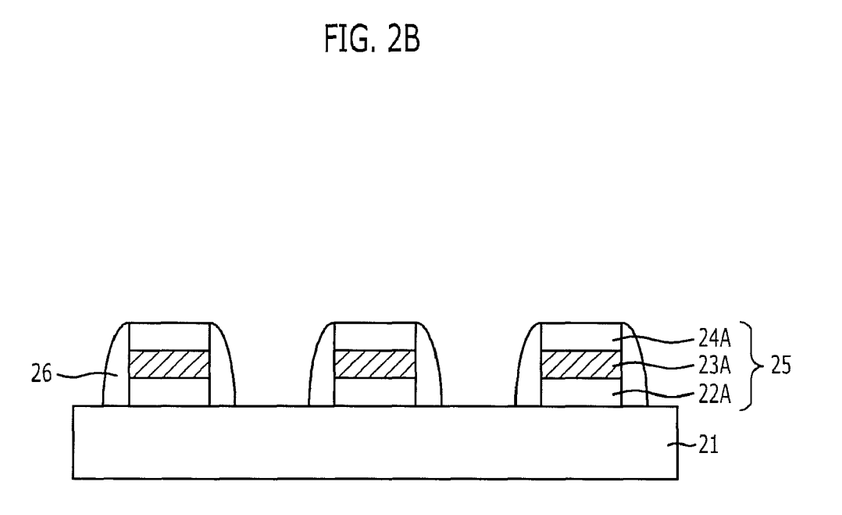

Referring to FIG. 2B, the hard mask nitride layer 24, the conductive layer 23 for gate electrode, and the polysilicon layer 22 are selectively etched to form a hard mask nitride pattern 24A, a conductive pattern 23A for gate electrode, and a polysilicon pattern 22A. The hard mask nitride pattern 24A, the conductive pattern 23A for gate electrode, and the polysilicon pattern 22A constitute a gate line 25.

An oxide layer (not shown) is formed over a resulting structure where the gate line 25 is formed, and it is etched to form an oxide spacer 26.

Figure 2C:
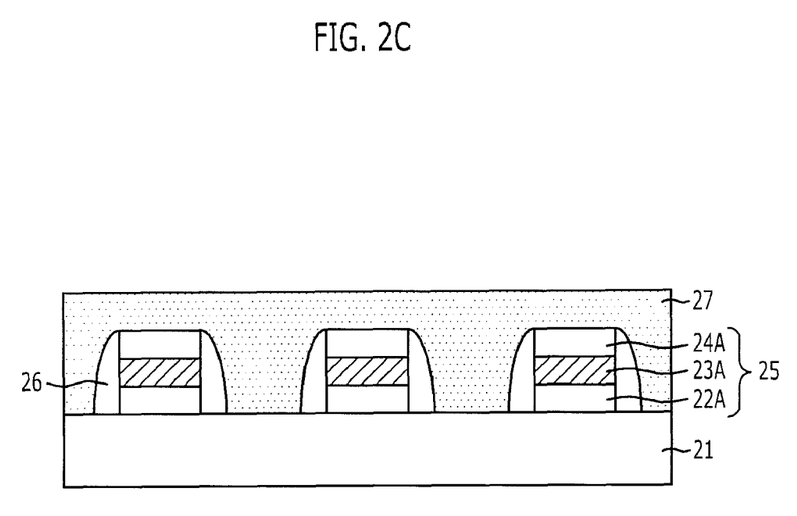

Referring to FIG. 2C, an interlayer insulation layer 27 is formed over a resulting structure where the gate line 25 and the oxide spacer 26 are formed. The interlayer insulation layer 27 may be formed of oxide.

Figure 2D:
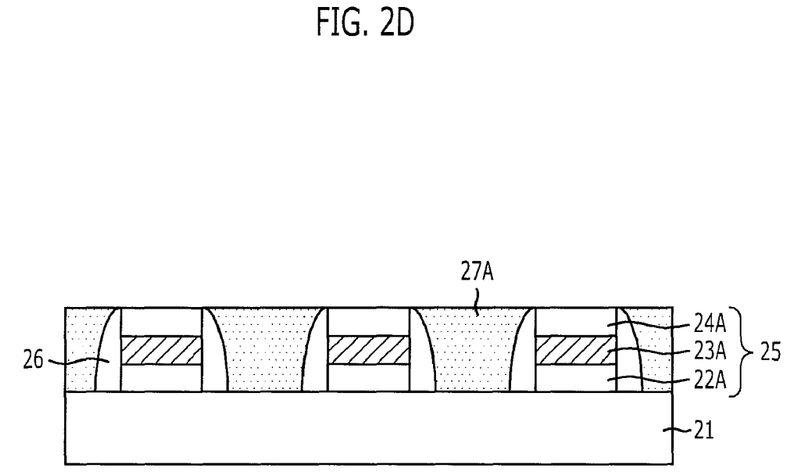

Referring to FIG. 2D, a polished interlayer insulation layer 27A is formed by performing a CMP process on the interlayer insulation layer 27 using the above-mentioned slurry till the hard mask nitride layer 24 is exposed.

According to the method for fabricating the semiconductor device using the ILD CMP process in accordance with the embodiment of the present invention, since the polishing efficiency is excellent and the polishing selectivity of the oxide layer to the nitride layer is high, the polished interlayer insulation layer 27A can be polished at high polishing rate with respect to the polished hard mask nitride layer 24A. Thus, the WIWNU can be improved and the scratches of the target surface can be prevented.

By performing the CMP process using the above-mentioned slurry, excellent polishing performance can be exhibited in view of the polishing rate, the polishing selectivity to the target surface, and the anti-scratch characteristic of the target surface. Thus, the WIWNU can be improved, and the reliability and economical efficiency of the device can be improved.

The embodiments of the present invention will be described in more detailed through examples and comparative examples, but it should be apparent to a person with ordinary skill in the art that the present invention is not limited to them.

EXAMPLE 1

Preparation of CMP Slurry 0.05-kg cerium oxide which has a specific surface area of 13.4 $m^2/g$, a 42:58 volume fraction of a pore having a diameter of 3 nm or more to a pore having a diameter of less than 3 nm, an average particle size of 0.23 µm, and a particle size distribution of approximately 0.01 µm to approximately 1 µm was mixed with 2-g polyacrylic acid (Mw. 4,000), and 500-l distilled water. In this case, after mixing 3-g polyacrylic acid (Mw. 8,000), a cerium oxide dispersing solution was prepared by adding the distilled water so that the content of the cerium oxide became 5 parts by weight per 100 parts by weight.

Also, the cerium oxide dispersing solution was dissolved in the water so that the content of a gluconic acid became 50 parts by weight, and a gluconic acid solution was prepared by adding ammonium hydroxide to adjust hydrogen exponent (pH) to 7.

The gluconic acid solution was mixed so that the gluconic acid became 10 parts by weight per 100 parts by weight of the cerium oxide powder contained in the cerium oxide dispersing solution, and the CMP slurry was prepared by adding the distilled water so that the content of the cerium oxide powder became 5 parts by weight per 100 parts by weight.

Figure 3:
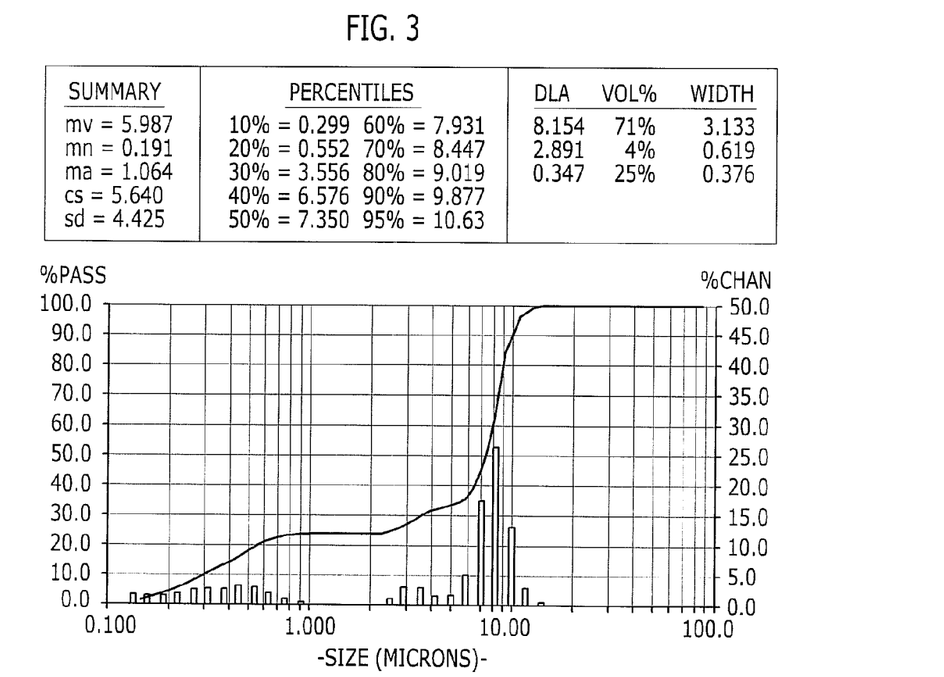
FIG. 3 is a graph illustrating a particle size of cerium oxide within a CMP slurry prepared in an example 1.

FIG. 3 illustrates the result obtained when the particle sizes of the cerium oxide inside the prepared CMP slurry were measured using an UPA particle size analyzer of MIcrotrac Inc.

It can be seen from FIG. 3 that the cerium oxide powder inside the CMP slurry exhibited the bimodal particle size distribution in which the volume fraction of a particle with 0.01 µm to 1 µm to a particle with 1 µm to 10 µm was 29:71.

Moreover, even though the cerium oxide with 1 µm to 10 µm was not used, it can be estimated from the particle with 1 µm to 10 µm that the cerium oxide particle with 1 µm to 10 µm was formed by aggregation of the cerium oxide particle with 0.01 µm to 1 µm.

EXAMPLE 2

Preparation of CMP Slurry 0.05-kg cerium oxide which has a specific surface area of 16.1 $m^2/g$, a 33:67 volume fraction of a pore having a diameter of 3 nm or more to a pore having a diameter of less than 3 nm, an average particle size of 0.23 µm, and a particle size distribution of approximately 0.01 µm to approximately 1 µm was mixed with 3-g polyacrylic acid (Mw. 4,000), and 500-l distilled water. In this case, after mixing 2-g polyacrylic acid (Mw. 8,000), a cerium oxide dispersing solution was prepared by adding the distilled water so that the content of the cerium oxide became 5 parts by weight per 100 parts by weight.

Also, the cerium oxide dispersing solution was dissolved in the water so that the content of a gluconic acid became 50 parts by weight, and a gluconic acid solution was prepared by adding ammonium hydroxide to adjust hydrogen exponent (pH) to 7.

The gluconic acid solution was mixed so that the gluconic acid became 10 parts by weight per 100 parts by weight of the cerium oxide powder contained in the cerium oxide dispersing solution, and the CMP slurry was prepared by adding the distilled water so that the content of the cerium oxide powder became 5 parts by weight per 100 parts by weight.

Figure 4:
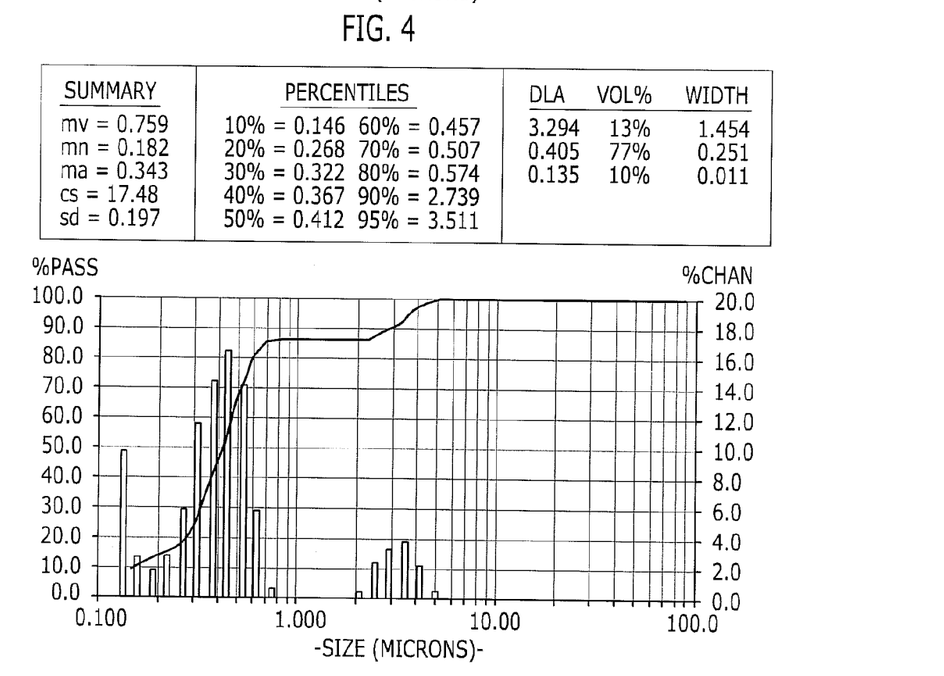
FIG. 4 is a graph illustrating a particle size of cerium oxide within a CMP slurry prepared in an example 2.

FIG. 4 illustrates the result obtained when the particle sizes of the cerium oxide inside the prepared CMP slurry were measured using an UPA particle size analyzer of MIcrotrac Inc.

It can be seen from FIG. 4 that the cerium oxide powder inside the CMP slurry exhibited the bimodal particle size distribution in which the volume fraction of a particle with 0.01 μm to 1 μm to a particle with 1 μm to 10 μm was 13:87.

COMPARATIVE EXAMPLE 1

Preparation of Comparative CMP Slurry 0.05-kg cerium oxide which has an average particle size of 0.23 μm and a particle size distribution of approximately 0.01 μm to approximately 1 μm was mixed with 5-g polyacrylic acid (Mw. 4,000). Then, a CMP slurry was prepared by adding a distilled water so that the content of the cerium oxide became 5 parts by weight per 100 parts by weight.

Figure 5:
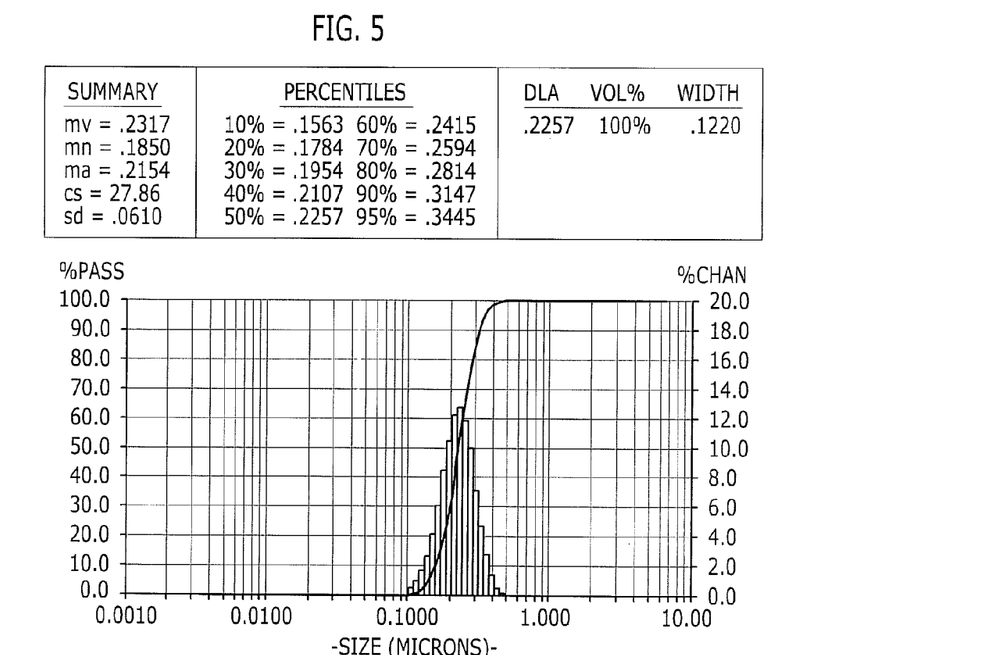
FIG. 5 is a graph illustrating a particle size of cerium oxide within a CMP slurry prepared in a comparative example 1.

FIG. 5 illustrates the result obtained when the particle sizes of the cerium oxide inside the prepared CMP slurry were measured using an UPA particle size analyzer of MIcrotrac Inc.

It can be seen from FIG. 5 that the cerium oxide inside the conventional CMP slurry exhibited the unimodal particle size distribution in which one peak had in a range of 0.01 μm to 1 μm.

COMPARATIVE EXAMPLE 2

Preparation of Comparative CMP Slurry 0.05-kg cerium oxide which has an average particle size of 0.23 μm and a particle size distribution of approximately 0.01 μm to approximately 1 μm was mixed with 5-g polyacrylic acid (Mw. 4,000). Then, a CMP slurry was prepared by adding a distilled water so that the content of the cerium oxide became 5 parts by weight per 100 parts by weight.

Figure 6:
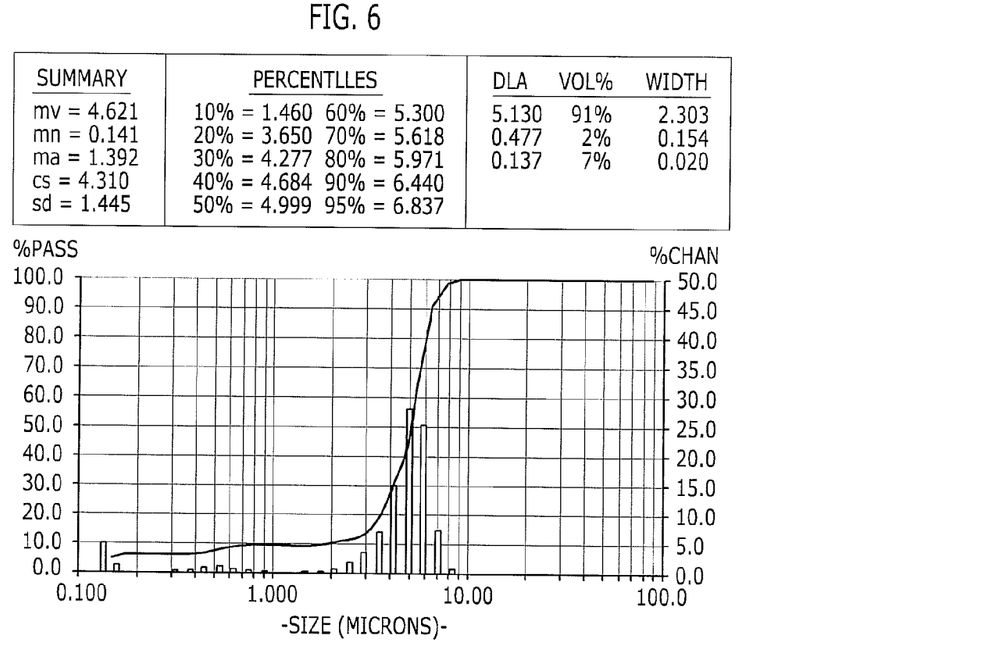
FIG. 6 is a graph illustrating a particle size of cerium oxide within a CMP slurry prepared in a comparative example 2.

FIG. 6 illustrates the result obtained when the particle sizes of the cerium oxide inside the prepared CMP slurry were measured using an UPA particle size analyzer of MIcrotrac Inc.

It can be seen from FIG. 6 that the cerium oxide powder inside the CMP slurry exhibited the substantially unimodal particle size distribution. In particular, it could be seen that, when the cerium oxide particle ranging from 1 μm to 10 μm exceeded 90% and only the second polyacrylic acid was used, aggregation between the cerium oxide particles was excessive and thus it was difficult to appropriately adjust the particle sizes of the cerium oxide powder.

EXPERIMENTAL EXAMPLE 1

Figure 7A:
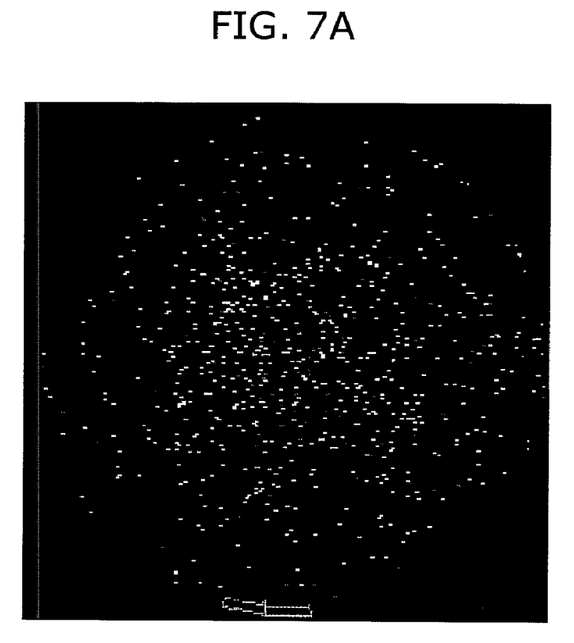
FIGS. 7A to 7B are pictures illustrating the number of particles obtained from a blanket wafer by using a conventional CMP slurry (HSS of Hitachi) and a CMP slurry of the above example in accordance with an experimental example 1.
Figure 7B:
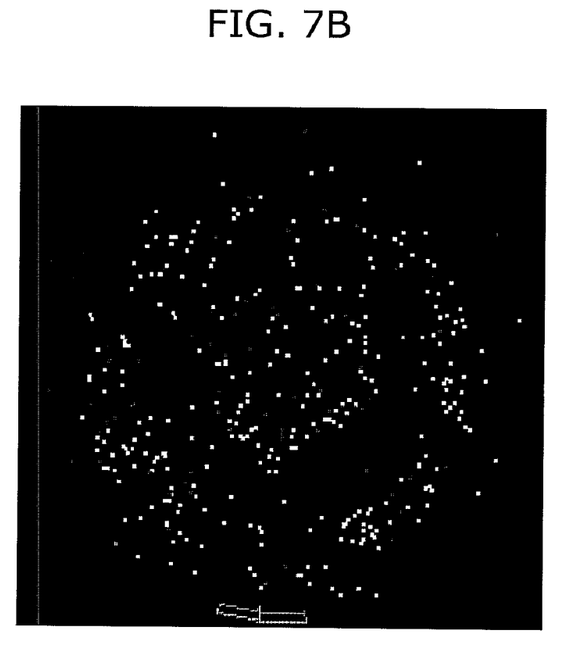

Table 1 below and FIG. 7 illustrate the comparison of the number of particles obtained from a blanket wafer by using the conventional CMP slurry (HSS of Hitachi) and the exemplary CMP slurry in accordance with the embodiment of the present invention.

TABLE 1

|  | Conventional CMP Slurry | Exemplary Slurry in accordance with the embodiment of the present invention |
|---|---|---|
| Total number of particles | 755 | 403 |
| Number of particles having particle sizes of 0.16 μm or more | 16 | 6 |

It can be seen from Table 1 and FIG. 7 that, when the exemplary CMP slurry in accordance with the embodiment of the present invention was used, the removal of the slurry was remarkably excellent to thereby improve the polishing efficiency, compared with the conventional slurry.

EXPERIMENTAL EXAMPLE 2

Figure 8A:
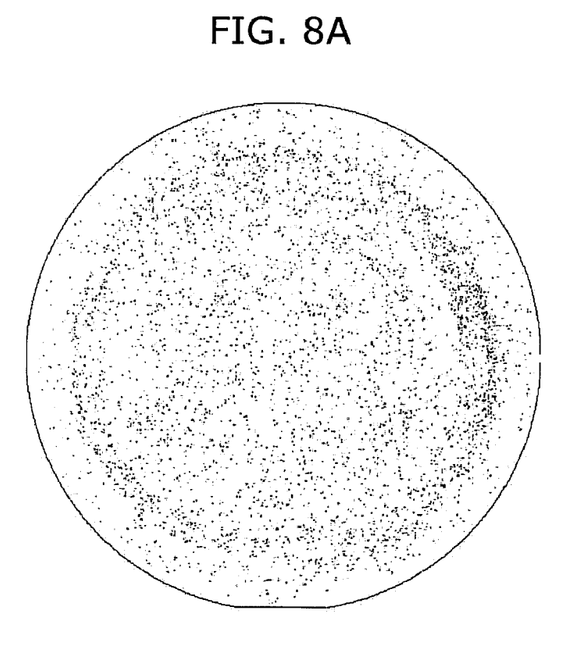
FIGS. 8A to 8B are pictures illustrating the number of scratches obtained from a blanket wafer by using a conventional CMP slurry (HSS of Hitachi) and a CMP slurry of the above example in accordance with an experimental example 2.
Figure 8B:
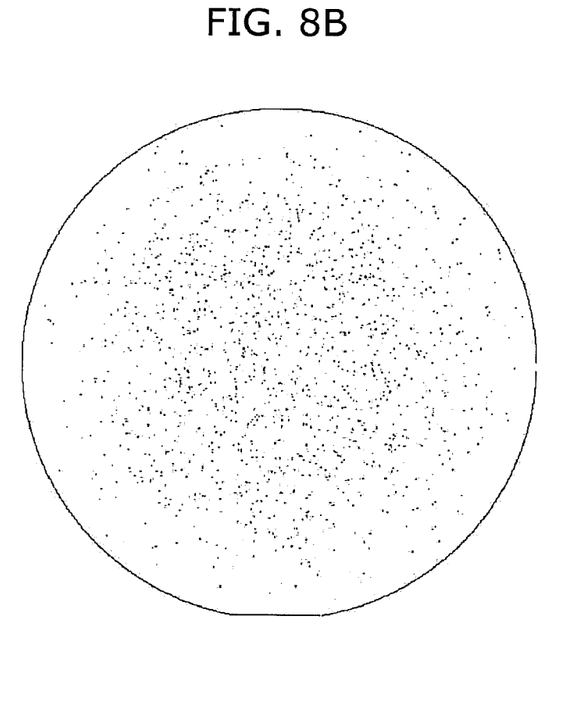

Table 2 below and FIG. 8 illustrate the comparison of the number of particles obtained from a blanket wafer by using the conventional CMP slurry (HSS of Hitachi) and the exemplary CMP slurry in accordance with the embodiments of the present invention.

TABLE 2

|  | Conventional CMP Slurry | Exemplary Slurry in accordance with the embodiment of the present invention |
|---|---|---|
| Total number of scratches | 4191 | 1600 |
| Number of scratches having sizes of 20 μm or more | 110 | 90 |

It can be seen from Table 2 and FIG. 8 that, when the exemplary CMP slurry in accordance with the embodiments of the present invention was used, the scratches on the target surface were remarkably removed to thereby ensure the reliability of the device, compared with the conventional slurry.

EXPERIMENTAL EXAMPLE 3

Figure 9:
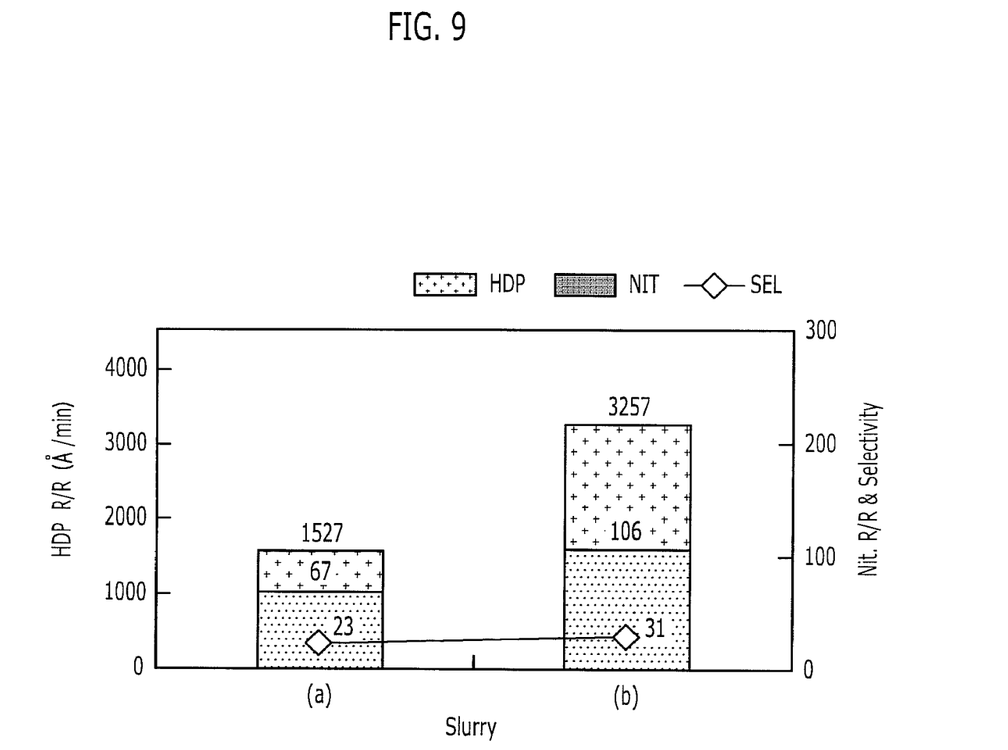
FIG. 9 is a graph illustrating a polishing rate and a polishing selectivity on an HDP layer and a nitride layer when CMP processes are performed on the layers using a conventional slurry (ULHSS) and a CMP slurry of the above example.

Table 3 below and FIG. 9 illustrate the result obtained when the polishing rate and the polishing selectivity with respect to the HDP layer and the nitride layer were measured after CMP processes were performed on the layers using the conventional slurry (ULHSS; slurry prepared by diluting the deionized water (DI) with HSS of Hitachi at a ratio of 50:1) and the exemplary CMP slurry in accordance with the embodiments of the present invention.

TABLE 3

|  | Conventional CMP Slurry | Exemplary Slurry in accordance with the embodiment of the present invention |
|---|---|---|
| Polishing rate (Å/min) of HDP layer | 1527 | 3257 |
| Polishing rate (Å/min) of nitride layer | 67 | 106 |

TABLE 3-continued

|  | Conventional CMP Slurry | Exemplary Slurry in accordance with the embodiment of the present invention |
|---|---|---|
| Ratio of polishing rate of oxide layer with respect to polishing rate of nitride layer (Polishing selectivity) | 23 | 31 |

It can be seen from Table 3 and FIG. 9 that, when the exemplary CMP slurry in accordance with the embodiments of the present invention was used, the polishing rates for the oxide layer and the nitride layer were improved, and the ratio of the polishing rate of the oxide layer with respect to the nitride layer, that is, the polishing selectivity was improved, compared with the conventional slurry (HLHSS).

EXPERIMENTAL EXAMPLE 4

Table 4 below illustrates the result obtained when the yields were measured after CMP processes were performed on the SOD layer and the HDP layer using the conventional slurry (HSS of Hitachi), the slurry (ULHSS; slurry prepared by diluting the deionized water (DI) with HSS of Hitachi at a ratio of 50:1), and the exemplary CMP slurry in accordance with the embodiments of the present invention.

TABLE 4

|  | Conventional Slurry (HSS of Hitachi) | Slurry (ULHSS; slurry prepared by diluting the deionized water (DI) with HSS of Hitachi at a ratio of 50:1) | Exemplary Slurry in accordance with the embodiments of the present invention |
|---|---|---|---|
| Yield (%) | 49% | 51.8% | 61.1% |

It can be seen from Table 4 that, when the exemplary CMP slurry in accordance with the embodiments of the present invention was used, the yield was remarkably improved, compared with the conventional CMP process.

EXPERIMENTAL EXAMPLE 5

Table 5A below illustrates the result obtained when usage of the conventional slurry (HSS of Hitachi) and the exemplary CMP slurry in accordance with the embodiment of the present invention. Specifically, Table 5A illustrates usage of slurry, in arbitrary units, which is used for one day for one apparatus during the CMP process using the slurries in the mass production of 300-mm wafers.

TABLE 5A

| Usage | Conventional Slurry (HSS of Hitachi) | Exemplary Slurry in accordance with the embodiment of the present invention |
|---|---|---|
| Usage of abrasive | 3.38 | 2.39 |
| Usage of additive | 5.07 | 0 |
| Total usage | 8.45 | 2.39 |

Table 5B below illustrates the result obtained when usage of the conventional slurry (ULHSS; slurry prepared by diluting the deionized water (DI) with HSS of Hitachi at a ratio of 50:1) and the exemplary CMP slurry in accordance with the embodiment of the present invention. Specifically, Table 5B illustrates usage of slurry, in arbitrary units, which is used for one day for one apparatus during the CMP process using the slurries in the mass production of 300-mm wafers.

TABLE 5B

| Usage | Conventional Slurry (ULHSS; slurry prepared by diluting the deionized water (DI) with HSS of Hitachi at a ratio of 50:1) | Exemplary Slurry in accordance with the embodiment of the present invention |
|---|---|---|
| Usage of abrasive | 0.49 | 0.25 |
| Usage of additive | 1.22 | 0 |
| Total usage | 1.71 | 0.25 |

It can be seen from Tables 5A and 5B that, when the exemplary slurry in accordance with the embodiment of the present invention was used in the CMP process, the usage was remarkably reduced, compared with the conventional slurry. Therefore, the cost for the fabricating process can be remarkably reduced by the reduction in the usage of the slurry in the actual mass production.

In the method for fabricating the semiconductor device in accordance with the embodiments of the present invention, since the CMP process is performed using the slurry having high polishing selectivity with respect to the target surface, uniform polished surface can be obtained, thereby improving the WIWNU to the optimum.

Since the process margin during the CMP process need not be set to be large, excellent polishing characteristic can be exhibited and the polishing efficiency can be improved, thereby ensuring the economical efficiency of the device.

Furthermore, the reliability of the device can be ensured because scratches on the target surface are prevented during the CMP process.

Moreover, since the usage of the slurry during the CMP process is reduced, the cost for mass production can be reduced.

While the present invention has been described with respect to the specific embodiments, it will be apparent to those skilled in the art that various changes and modifications may be made without departing from the spirit and scope of the invention as defined in the following claims.

What is claimed is:

1. A method for fabricating a semiconductor device by using a chemical mechanical polishing (CMP) process with a slurry comprising:

a cerium oxide powder with a bimodal particle size distribution in which a volume fraction of a first cerium oxide particle having a particle size of approximately 0.01 µm to approximately 1 µm to a second cerium oxide particle having a particle size of approximately 1 µm to 10 µm is in a range between 10:90 and 90:10, wherein the first cerium oxide particle having the particle size of approximately 0.01 µm to approximately 1 µm has a specific surface area of 5 m$^2$/g or more, a volume fraction of a pore having a diameter of 3 nm or more to a pore having a diameter of less than 3 nm is in a range between 8:2 and 2:8, and the second cerium oxide particle having the particle size of approximately 1 µm to approximately 10 µm is formed by aggregation of the first cerium oxide particles having the particle size of approximately 0.01 µm to approximately 1 µm;
a first polyacrylic acid having a weight average molecular weight of approximately 2,000 to approximately 8,000, and a second polyacrylic acid having a weight average molecular weight of approximately 5,000 to 10,000;
a compound having a weight average molecular weight of approximately 30 to approximately 500 and containing at least one of a hydroxyl group (OH) and a carboxyl group (COON); and
a water.

2. The method of claim 1, wherein the CMP process is used in a CMP process for a heterogeneous layer.

3. The method of claim 1, wherein the CMP process is used in a shallow trench isolation (STI) CMP process, an interlayer dielectric (ILD) CMP process, a plug poly isolation CMP process, a storage node isolation CMP process, or a metal CMP process.

4. The method of claim 1, wherein a content of the cerium oxide powder is in a range of approximately 0.1 to 10 parts by weight per 100 parts by weight of the slurry.

5. The method of claim 1, wherein a total content of the first and second polyacrylic acids is in a range of approximately 0.05 to approximately 20 parts by weight per 100 parts by weight of the cerium oxide power.

6. The method of claim 1, wherein a mass ratio of the first polyacrylic acid to the second polyacrylic acid is in a range of 70:30 to 30:70.

7. The method of claim 1, wherein the compound having the weight average molecular weight of approximately 30 to approximately 500 and containing at least one of the hydroxyl group (OH) and the carboxyl group (COOH) is one selected from the group comprising citrate-containing compounds, gluoconate-containing compounds, malate-containing compounds, tartarate-containing compounds, 2-hydroxyisobutyrate-containing compounds, adipate-containing compounds, octanoate-containing compounds, succinate-containing compounds, ethylenediaminetetracetate (EDTA)-containing compounds, glutarate-containing compounds, methylenesuccinate-containing compounds, mannose, glycerol-galacto-heptose, erythro-manno-octose, arabino-galacto-nonose, and glutamine.

8. The method of claim 1, wherein a content of the compound having the weight average molecular weight of approximately 30 to approximately 500 and containing at least one of the hydroxyl group (OH) and the carboxyl group (COOH) is in a range of approximately 0.01 to 30 parts by weight per 100 parts by weight of the cerium oxide powder.

9. The method of claim 1, wherein the slurry has a polishing selectivity of a nitride layer to an oxide layer in a range from 1:30 to 1:50.

10. The method of claim 1, wherein the CMP process is performed at a polishing pressure of approximately 1 psi to approximately 10 psi at a polishing table speed of approximately 10 rpm to approximately 100 rpm.

11. A method for fabricating a semiconductor device, the method comprising:
forming a hard mask over a semiconductor substrate;
forming a trench in the semiconductor substrate by using the hard mask;
forming a gap-fill insulation layer to fill the trench;
performing a CMP process till the hard mask is exposed by using the hard mask as a polishing stop layer; and
removing the hard mask,
wherein the CMP process is performed by using a slurry comprising:
a cerium oxide powder with a bimodal particle size distribution in which a volume fraction of a first cerium oxide particle having a particle size of approximately 0.01 µm to approximately 1 µm to a second cerium oxide particle having a particle size of approximately 1 µm to 10 µm is in a range between 10:90 and 90:10,
wherein the first cerium oxide particle having the particle size of approximately 0.01 µm to approximately 1 µm has a specific surface area of 5 $m^2$/g or more,
a volume fraction of a pore having a diameter of 3 nm or more to a pore having a diameter of less than 3 nm is in a range between 8:2 and 2:8, and
the second cerium oxide particle having the particle size of approximately 1 µm to approximately 10 µm is a secondary particle formed by aggregation of the first cerium oxide particle having the particle size of approximately 0.01 µm to approximately 1 µm;
a first polyacrylic acid having a weight average molecular weight of approximately 2,000 to approximately 8,000, and a second polyacrylic acid having a weight average molecular weight of approximately 5,000 to 10,000;
a compound having a weight average molecular weight of approximately 30 to approximately 500 and containing at least one of a hydroxyl group (OH) and a carboxyl group (COOH); and
a water.

12. The method of claim 11, wherein the hard mask has a stacked structure of a pad oxide layer and a pad nitride layer.

13. The method of claim 12, further comprising, after forming the trench;
forming a sidewall oxide layer on a surface of the semiconductor substrate and a sidewall of the pad oxide layer exposed by the formation of the trench; and
forming a liner nitride layer over the hard mask comprising the sidewall oxide layer.

14. The method of claim 11, wherein the gap-fill insulation layer comprises an oxide layer.

15. The method of claim 11, wherein a content of the cerium oxide powder is in a range of approximately 0.1 to 10 parts by weight per 100 parts by weight of the slurry.

16. The method of claim 11, wherein a total content of the first and second polyacrylic acids is in a range of approximately 0.05 to approximately 20 parts by weight per 100 parts by weight of the cerium oxide power.

17. The method of claim 11, wherein a mass ratio of the first polyacrylic acid to the second polyacrylic acid is in a range of 70:30 to 30:70.

18. The method of claim 11, wherein the compound having the weight average molecular weight of approximately 30 to approximately 500 and containing at least one of the hydroxyl group (OH) and the carboxyl group (COOH) is one selected from the group comprising citrate-containing compounds, gluoconate-containing compounds, malate-containing compounds, tartarate-containing compounds, 2-hydroxyisobutyrate-containing compounds, adipate-containing compounds, octanoate-containing compounds, succinate-containing compounds, ethylenediaminetetracetate (EDTA)-containing compounds, glutarate-containing compounds, methylenesuccinate-containing compounds, mannose, glycerol-galacto-heptose, erythro-manno-octose, arabino-galacto-nonose, and glutamine.

19. The method of claim 11, wherein a content of the compound having the weight average molecular weight of approximately 30 to approximately 500 and containing at least one of the hydroxyl group (OH) and the carboxyl group (COOH) is in a range of approximately 0.01 to 30 parts by weight per 100 parts by weight of the cerium oxide powder.

20. The method of claim 11, wherein the slurry has a polishing selectivity of a nitride layer to an oxide layer in a range from 1:30 to 1:50.

21. The method of claim 11, wherein the CMP process is performed at a polishing pressure of approximately 1 psi to approximately 10 psi at a polishing table speed of approximately 10 rpm to approximately 100 rpm.

* * * * *